(No Model.)  S. F. SHELBOURNE.  2 Sheets—Sheet 1.
ELECTRIC CABLE.

No. 297,177.  Patented Apr. 22, 1884.

Witnesses:
John Buckler,
Geo. L. Weed.

Inventor:
Sidney F. Shelbourne (No Model.) 2 Sheets—Sheet 2.

S. F. SHELBOURNE.
ELECTRIC CABLE.

No. 297,177. Patented Apr. 22, 1884.

WITNESSES
Wm A. Lowe
Oliver M. Earls

INVENTOR
Sidney F. Shelbourne

UNITED STATES PATENT OFFICE.

SIDNEY F. SHELBOURNE, OF NEW YORK, N. Y.

ELECTRIC CABLE.

SPECIFICATION forming part of Letters Patent No. 297,177, dated April 22, 1884.

Application filed August 18, 1883. (No model.)

*To all whom it may concern:*

Be it known that I, SIDNEY F. SHELBOURNE, a citizen of the United States, residing in the city of New York, and State of New York, have invented a new and useful Improvement in Electric Cables, a particular description of which is herein set forth.

The object of my present invention is to prevent, or more completely obviate than has hitherto been done, the effects of induction between conductors associated together in near proximity in the same line or cable, and thus eliminate one of the most serious difficulties now experienced in the use of electricity underground for telephonic purposes.

The scientific facts of the magnetic action of conductors carrying currents of electricity discovered by Oersted, and thereafter reduced to mathematical formula by Ampére, have well established the proposition that right and left helical conductors, side by side, and carrying electrical currents in the same direction, exhibit opposite magnetic polarities at their adjacent ends. When Faraday discovered the correlation of magnetism to electricity in the fact that induced currents were due to and produced by magnetic influence, the converse of the foregoing proposition was logically established, that the same exterior source of magnetic induction would cause opposite currents in such helical conductors placed in the same given relation.

The present invention is based on the correlation just explained. So far as the earth's magnetism is concerned in causing induced currents, it is to be observed that its effect upon dextrorsal and sinistrorsal conductors, side by side, would be to produce, at the same instant, currents in each in opposite directions.

The present invention therefore consists in the arrangement of two or more singly-insulated conductors in elongated helices about each other, with reversing spirals, such arrangement constituting each individual strand or longitudinal succession of strands of the cable; and, secondly, in the arrangement of these strands in the relation of dextrorsal and sinistrorsal helices in any two contiguous strands, composing a given portion of the cable.

Figure 1:
Figure 2:
Figure 3:
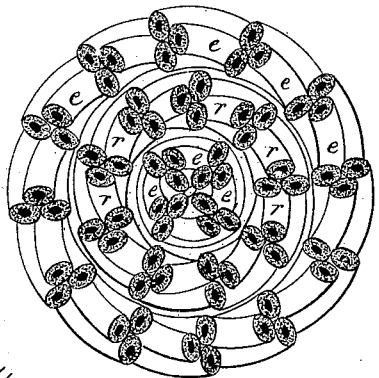
Figure 4:
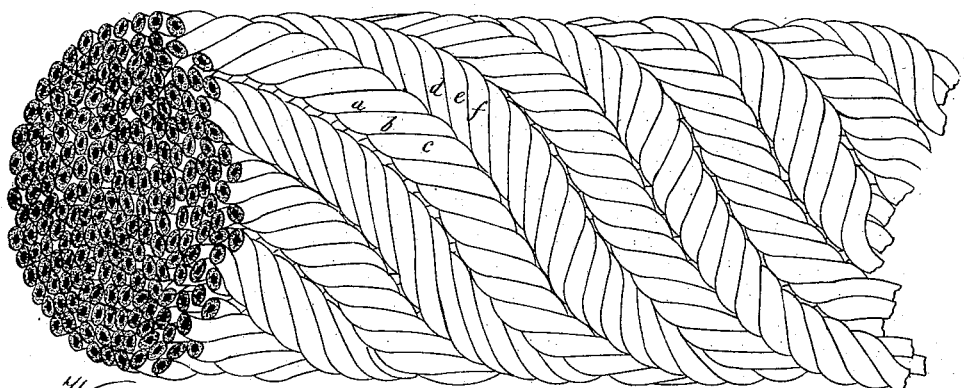

Referring to the drawings making part of this specification, Figure 1 shows in perspective a dextrorsal strand composed of three insulated wires, while Fig. 2 is a like perspective view of the same number of wires in a strand of senistrorsal arrangement. Fig. 3 is an end view of a cable composed of twenty-five such strands as are shown in Figs. 1 and 2, and represents these strands arranged in spiral series circumferentially about each other, in the manner shown with reference to single conductors in Patent No. 275,424, dated April 10, 1883, the strands of one series commencing, if preferred, with the series at the central portion of the cable, passing in a left-hand spiral, and those of the next series in opposite spirals, as shown at $r\ r\ r$ in the figure, while those of the next outer series again pass in left-hand spirals, as shown at $l\ l\ l$. Fig. 4 represents a cable composed of a large number of right and left strands, in which the position of adjacent conductors in those strands, obviating parallelism of currents, is clearly illustrated at $a\ b\ c$ and $d\ e\ f$. This figure, by inadvertence as to its lines, presents an exaggeration of spirals, which will be unnecessary in practice.

Figure 5:
Figure 6:
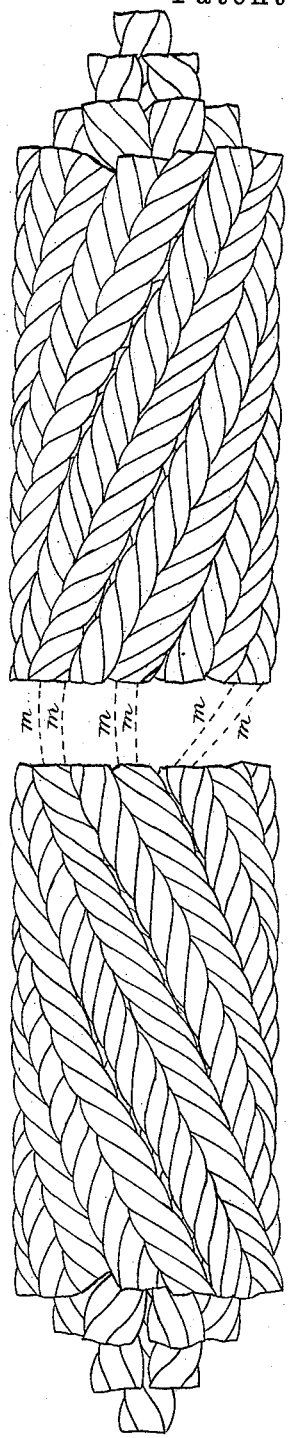

The length of the divisions or sections of cables for use in cities will be about five hundred and twenty feet, or the length of two city blocks. Referring again to Figs. 1 and 2, if, now, at the connection-boxes for joining the conductors of two divisions of the cable the conductors $a$, $b$, and $c$, or either of them, in one division, are connected in the succeeding division with conductors of opposite spiral—as, for instance, conductor $d$, $e$, or $f$, Fig. 2—it will be seen that the same conductor will present itself in the whole connected line of cable as a spiral of reversing direction in each division of the same. This connection of the conductors is definitely shown by the dotted lines at $t\ t\ t$, Fig. 5. When, therefore, the magnetic induction of the earth causes currents in a conductor thus arranged, it will be seen that these currents will tend in opposite directions between any two sections of the cable, and therefore neutralize or balance each other. The arrangement, as to opposite spirals and their effects, is duplicated and again secured in the like spirals and their connections, of the strands themselves passing in series of opposite direction about each other and connected between each of the divisions with strands of reversing spiral. This further combination of the conductors, as represented in the spirals of the strands of the cable, is clearly designated by the several dotted lines, as shown at *m m m*, &c., Fig. 6. The arrangement of the conductors and strands in spirals, as shown, occasions the employment of wires of a length about five to eight per cent. longer than would be required for the same distance in a linear direction, but with the advantages, on the other hand, that these spirals secure a provision for the expansion and contraction of the wires by a movement in a lateral direction, instead of producing a longitudinal strain upon them between their fixed supports or ends, as is the case with linear parallel conductors.

What I claim as new is—

1. A series of strands for an electric cable, each composed of two or more separately-insulated conductors formed into a helix about each other, and arranged in succeeding divisions within a line or lines of cable, so that the spirals of the strand in any one division are reversed in direction with reference to the spirals of the connecting strand or conductors in the preceding division, for the purpose of balancing the currents of induction, as herein set forth.

2. Two or more helical strands of separately-insulated conductors, arranged about each other helically, substantially as described.

3. An electric cable composed of two or more helical strands of insulated conductors in which the helices of any two strands laterally adjacent in the same division are of opposite direction or spiral, substantially as and for the purpose set forth.

4. An electric cable composed of layers or series of helical strands in which the strands are arranged in series of opposite spirals around each other, for the purpose and in manner as described.

5. The adjacent divisions of an electric cable composed of several series of helical strands of insulated conductors, in combination with each other, so that the spirals of the same series of strands in the cable shall be of opposite spiral direction in the adjacent divisions, substantially as and for the purpose described.

SIDNEY F. SHELBOURNE.

Witnesses:
FRANK S. TYLER,
GEO. L. WEED.